Dec. 22, 1931.   G. STRECKER   1,838,009
SURFACE ATOMIZER FOR LIQUID FUEL
Filed Aug. 18, 1930
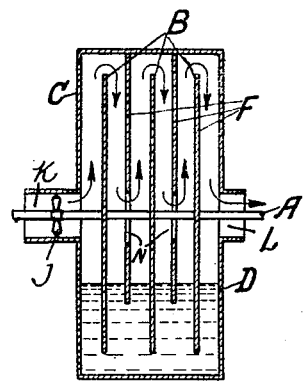
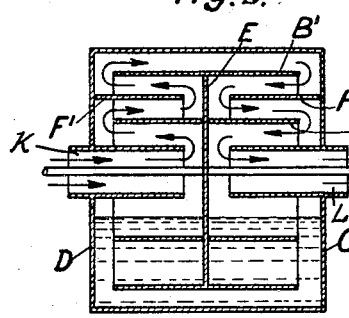
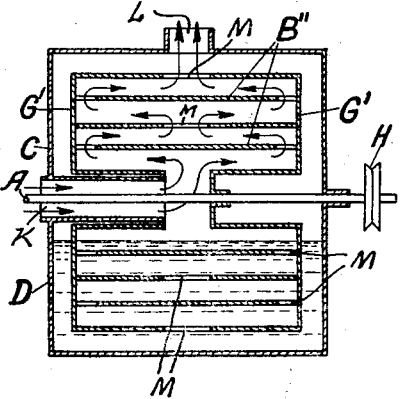

Patented Dec. 22, 1931

1,838,009

UNITED STATES PATENT OFFICE

GERALD STRECKER, OF DARMSTADT, GERMANY

SURFACE ATOMIZER FOR LIQUID FUEL

Application filed August 18, 1930, Serial No. 476,229, and in Germany January 7, 1928.

The known atomizers for liquid fuels have, as is well known, the important disadvantage that they do not produce a dry mixture of air and fuel. The latter is mostly contained in the mixture in the form of a mist or small drops. For this reason the mixture, as is found from experience, must have an excess of fuel over the amount theoretically necessary for the quantity of air. This is a disadvantage from an economic point of view as a portion of the fuel supplied to the engine is not used. Then there is the further technical disadvantage that there is not a complete combustion to carbon dioxide but other residues of combustion are formed which as is well known influence the running of the engine by carbon deposits.

The present invention relates to a surface atomizer for liquid fuels which is free from these disadvantages and having a rotary member dipping into the fuel by means of which there is obtained a completely dry mixture of air and fuel. This result is obtained as all the parts of the dipping member out of the fuel and of which the surface is moistened with fuel are exposed positively and uniformly to the air flowing through the atomizer.

In addition to this advantage the new atomizer has the further advantage that it is insensitive to water and foreign bodies. The water is not carried by the dipping body as this is solely moistened with fuel and any foreign bodies that may be contained in the fuel collect at the bottom of the fuel chamber from which they are not carried away by the dipping body. As the new atomizer is not provided with a nozzle it is clear that this cannot be clogged up by any foreign bodies contained in the fuel.

Similar reference characters indicate the same parts in the several figures, in which:

Figure 1 represents a longitudinal section of the invention in that the dipping bodies or blades in planes are at right angles to the longitudinal axis; and, Figures 2 and 3 are similar sections of modified forms in which the supplemental dipping bodies or blades are arranged parallel to the longitudinal axis.

In the accompanying drawings are illustrated, diametrically, in section, three examples of construction of the new atomizer, in which the path of the air or of the mixture is indicated by arrows.

In all the forms of the present atomizer there is provided a casing or housing C, which is provided at its lower portion with a fluid volatile hydrocarbon D, at the level indicated.

Said housing is provided with an inlet opening K for the air and a properly disposed outlet L for the mixture.

Axially disposed within the housing or case C and above the level of the hydrocarbon D is a rotatable shaft A, which is capable of being rotated by a fan or blade wheel J fixed to the shaft within the inlet opening K, shown in Figure 1, or by means of a belt pulley K, as shown in Figure 3, and in the use of fan J there is assured a uniform proportion of mixture between the fuel or hydrocarbon, as will be readily understood.

In the construction shown in Figure 1, the dipping body consists of a plurality of annular blades or disks B secured to the shaft B. Between the disks or blades are provided walls or partitions F extending from the casing C, said walls being provided with openings N, for the passage of the shaft A, and said disks or blades B dip, as illustrated, with their lower edges into the fuel D.

The air entering the inlet K is forced by the fan J to take a winding or zigzag path, as indicated by the arrows, and in its circuitous path along all the blades or disks in series and in contact with both sides of each of said blades or disks, as clearly seen by the drawings, which construction provides an inexpensive and most efficient and compact structure for the purpose desired.

In the form of construction shown in Figure 2, the dipping or immersed body consists of a plurality of hollow cylindrical separated walls or blades B' arranged concentrically to the shaft A, which extend from a solid central disk E secured normally to the shaft A. Between the walls B' are provided partitions F', extending from both end walls of the casing C, and dipping with their lower portions into the fuel D. The air entering the inlet K is, therefore, also made to follow a winding or zigzag path, as indicated by the arrows, and eventually pass out through the outlet or oppositely disposed extension L.

In the form of construction shown in Figure 3, the dipping body also consists of a plurality of hollow separated cylindrical walls or blades B'' arranged concentrically to the shaft A. In this modification, the blades or walls B'' extend from two imperforate end disks G' secured to the shaft and said walls B'' at their middle and their edges are provided with passages M, for the air, in order to provide a zigzag path for the air entering at inlet K and passing out at the upper outlet L, as indicated by the arrows.

From the foregoing disclosures of Figures 2 and 3, it will also be readily seen that the same efficient operation of having the air come in contact with both sides of each of the blades or walls B' or B'' is obtained.

In all cases the shaft A, whether driven by a belt pulley or a blade wheel K, is rotated so slowly that each part of the dipping body, before it enters the liquid, completely gives up all the quantity of fuel adhering thereto to the air. If the fuel is not of uniform constitution but consists of a mixture of two or more liquids having a different boiling point then the speed of rotation of the shaft is made dependent upon the liquid with the lowest boiling point as otherwise an enriching of the fuel with those constituents having higher boiling points would be liable to occur.

When the shaft A is driven by a belt pulley this may be rotated by a separate electric motor or by the engine of the power vehicle itself. In both cases the speed of rotation of the shaft A is preferably made adjustable.

For starting the engine of the vehicle it is preferable to connect the shaft A in any suitable manner to the starter in such a manner that when depressing the usual starting switch, by which the starter is switched in, the shaft is also rotated.

In all the forms of construction the level of the fuel D is kept constant in the known manner by a float or other device not shown. In order to prevent the atomizer catching fire it is protected both on the inlet side for the air and on the outlet side for the air-fuel mixture by close meshed wire netting. Preferably all the air necessary for the engine is drawn in through the atomizer and before entering this may be somewhat pre-heated.

I claim:—

1. A surface atomizer for liquid fuel, comprising a casing with liquid fuel in the lower portion thereof and having an air inlet and a mixture outlet, a rotatable shaft mounted horizontally within said casing above the fuel, means for rotating said shaft, a plurality of blades mounted on said shaft and dipping into the fuel, and means for guiding the air to flow in a circuitous path along all the blades in series on both sides of them.

2. A surface atomizer for liquid fuel, comprising a casing with liquid fuel in the lower portion thereof and having an air inlet and a mixture outlet, a rotatable shaft mounted horizontally within said casing above the fuel, means for rotating said shaft, a plurality of circular blades mounted at right angles on said shaft and dipping into the fuel, and a plurality of plane partitions extending inwardly from said casing at right angles to said shaft between said blades and dipping into the fuel for guiding the air to flow in a circuitous path along all the blades in series on both sides of them.

3. A surface atomizer for liquid fuel, comprising a casing with liquid fuel in the lower portion thereof and having an air inlet and a mixture outlet, a rotatable shaft mounted horizontally within said casing above the fuel, means for rotating said shaft, a circular disk mounted at right angle on said shaft and dipping into the fuel, a plurality of cylindrical blades fixed concentrically to said shaft on both sides of said disk, and a plurality of cylindrical partitions extending inwardly and concentrically to said shaft from said casing between said blades and dipping into the fuel for guiding the air to flow in a circuitous path along all the blades in series on both sides of them.

4. A surface atomizer for liquid fuel, comprising a casing with liquid fuel in the lower portion thereof and having an air inlet and a mixture outlet, a rotatable shaft mounted horizontally within said casing above the fuel, means for rotating said shaft, a circular disk mounted at right angle on said shaft and dipping into the fuel, a plurality of cylindrical blades fixed concentrically to said shaft on one side of said disk, a ring shaped disk fixed at the opposite borders of said blades, and openings provided alternately in the middle part and at the outer borders of said blades for guiding the air to flow in a circuitous path along all the blades in series on both sides of them.

In testimony whereof I affix my signature.

GERALD STRECKER.